US009407703B2

(12) United States Patent
Onuma

(10) Patent No.: US 9,407,703 B2
(45) Date of Patent: Aug. 2, 2016

(54) CONNECTION MANAGEMENT SYSTEM, AND A METHOD FOR LINKING CONNECTION MANAGEMENT SERVER IN THIN CLIENT SYSTEM

(75) Inventor: Hiroaki Onuma, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 13/197,182

(22) Filed: Aug. 3, 2011

(65) Prior Publication Data

US 2012/0036254 A1 Feb. 9, 2012

(30) Foreign Application Priority Data

Aug. 9, 2010 (JP) ................................. 2010-178712

(51) Int. Cl.
*H04L 29/08* (2006.01)

(52) U.S. Cl.
CPC ............... *H04L 67/16* (2013.01); *H04L 67/28* (2013.01); *H04L 67/04* (2013.01); *H04L 67/288* (2013.01)

(58) Field of Classification Search
CPC ......... H04L 67/04; H04L 67/16; H04L 67/28; H04L 67/288
USPC ....................................................... 709/224
See application file for complete search history.

(56) References Cited

U.S. PATENT DOCUMENTS

| 6,574,229 | B1 | 6/2003 | Takahashi et al. | |
| 7,457,878 | B1* | 11/2008 | Mathiske et al. | 709/227 |
| 2002/0065879 | A1* | 5/2002 | Ambrose et al. | 709/203 |
| 2002/0174010 | A1* | 11/2002 | Rice, III | 705/14 |
| 2006/0047836 | A1* | 3/2006 | Rao et al. | 709/229 |
| 2006/0074918 | A1* | 4/2006 | Nakatsuka et al. | 707/10 |
| 2007/0294414 | A1* | 12/2007 | Koshiba | 709/227 |
| 2008/0228480 | A1* | 9/2008 | Maegawa | 704/235 |
| 2008/0263217 | A1* | 10/2008 | Kimizuka et al. | 709/229 |
| 2011/0185064 | A1* | 7/2011 | Head et al. | 709/226 |
| 2011/0239215 | A1* | 9/2011 | Sugai | 718/1 |

FOREIGN PATENT DOCUMENTS

| CN | 101197743 A | 6/2008 |
| CN | 101632284 A | 1/2010 |
| EP | 1950930 A2 | 7/2008 |
| JP | 2000-132524 A | 5/2000 |
| JP | 2008140306 A | 6/2008 |

OTHER PUBLICATIONS

R. Ahmed et al., "Resource and Service Discovery in Large-Scale Multi-Domain Networks", IEEE Communications Surveys, IEEE, vol. 9, No. 4, Oct. 1, 2007, pp. 2-30.
Japanese Office Action for JP Application No. 2010-178712 mailed on Apr. 16, 2014 with Partial English Translation.
"Resource and Service Discovery in Large-Scale Multi-Domain Networks" on p. P1-P39,Published Oct. 14, 2007, See cited doc (47th Quarter 2007, vol. 9, No. 4.
Chinese Office Action for CN Application No. 201110229965.4 on Sep. 3, 2014 with English Translation.

* cited by examiner

Primary Examiner — Khaled Kassim

(57) ABSTRACT

An exemplary object of the present invention is to suppress the load on each server and network traffic. To achieve this, a plurality of connection management servers are installed so that any of the connection management servers executes acceptance of a connection request from a thin client terminal. Further, the connection management servers manage the states of clients in order to hold the states of the respective clients, and each of the connection management servers searches a client that can be connected by the thin client terminal according to a connection request from this thin client terminal, and replies with the search result to the thin client terminal, and a range of the connection management servers for executing the search of the client is limited for each connection request from the thin client terminal to the thin client server.

4 Claims, 6 Drawing Sheets

FIG. 2

GROUP INFORMATION MANAGEMENT TABLE 23

| CLIENT NAME | CLIENT GROUP |
|---|---|
| CLIENT#1-1 | C-A |
| CLIENT#1-2 | C-B |
| CLIENT#2-1 | C-A |
| CLIENT#2-2 | C-B |
| ... | ... |

| THIN CLIENT TERMINAL NAME | THIN CLIENT TERMINAL GROUP |
|---|---|
| THIN CLIENT TERMINAL#1 | T-A |
| THIN CLIENT TERMINAL#2 | T-B |
| THIN CLIENT TERMINAL#3 | T-A |
| THIN CLIENT TERMINAL#4 | T-B |
| ... | ... |

| USER NAME | CLIENT GROUP |
|---|---|
| USER#1 | U-A |
| USER#2 | U-A |
| USER#3 | U-B |
| USER#4 | U-B |
| ... | ... |

FIG. 3

CONNECTION DESTINATION SETTING INFORMATION TABLE 24

| CLIENT GROUP | USER GROUP | THIN CLIENT TERMINAL GROUP |
|---|---|---|
| C-A | U-A | T-A, T-B |
| C-B | U-B | T-C |
| C-C | ALL USERS | ALL TERMINALS |
| ... | ... | ... |

FIG.4

CLIENT STATE MANAGEMENT TABLE 25

| CLIENT | STATE | LOGON USER | THIN CLIENT TERMINAL |
|---|---|---|---|
| CLIENT#1-1 | POWER ON | - | - |
| CLIENT#1-2 | LOGON | USER#1 | THIN CLIENT TERMINAL#1 |
| CLIENT#2-1 | POWER OFF | - | - |
| ... | ... | ... | ... |

FIG.5

SERVER CONFIGURATION INFORMATION TABLE 26

| CONNECTION MANAGEMENT SERVER NAME | RANGE IDENTIFIER |
|---|---|
| CONNECTION MANAGEMENT SERVER#1 | 1 |
| CONNECTION MANAGEMENT SERVER#2 | 1 |
| CONNECTION MANAGEMENT SERVER#3 | 2 |

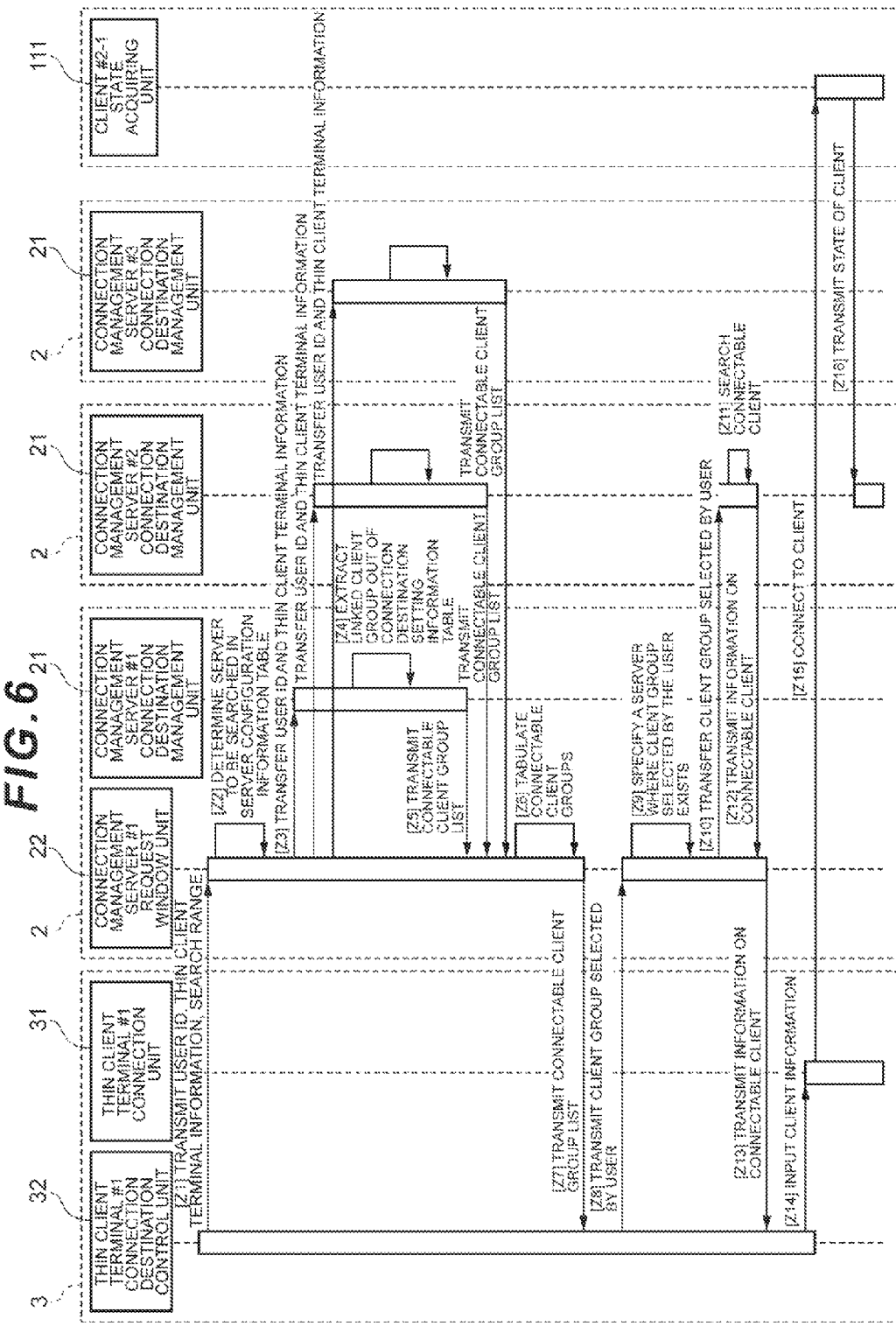

CONNECTION MANAGEMENT SYSTEM, AND A METHOD FOR LINKING CONNECTION MANAGEMENT SERVER IN THIN CLIENT SYSTEM

CROSS-REFERENCES

This application is based upon and claims the benefit priority from Japanese patent application No. 2010-178712, filed on Aug. 9, 2010, the disclosure of which is incorporated herein in its entirety by reference.

BACKGROUND

The present invention relates to a connection management system and a method for linking a connection management server in a thin client system.

In a conventional client-server formed system, a PC having a magnetic disk device or the like is used as a client terminal, but recently there are cases in which one user uses a plurality of PCs or one PC is shared for a plurality of businesses, because business is becoming more complicated, and as a result, the management cost of a client terminal is increasing, which is partially due to the need for more complicated software for a client terminal. Furthermore, the existence of such a storage device as a magnetic disk device in a client terminal increases the risk of information leakage.

This means that today, in some cases, a business system is constructed by a combination of a diskless terminal (such a storage device as a magnetic disk device is not equipped) or a terminal in which writing to a disk is disabled (hereafter called "thin client terminal") and a server (hereafter called "thin client server") where data is held, and where an operating system (OS) and business applications are executed.

A thin client server which executes business applications, that were once executed by a client terminal in a conventional client-server formed system, has a virtually constructed client as an execution unit (execution image) for each thin client terminal, and in the client, an OS, business applications and data, which are assigned by the thin client terminal for each connection, are installed. Generally a thin client server manages a plurality of thin client terminals, therefore a plurality of clients operate on a same thin client server.

In such a thin client system, a user at a thin client terminal connects to the client operating in a data center, for example, via a network, and executes applications on the client. Inputs required for executing the applications are executed via the thin client terminal, and the result of executing the applications is checked on the screen of the thin client terminal.

In a thin client system, a plurality of users may share a plurality of clients, and in order to improve system convenience, a structure is required when a user starts using the thin client system, a client that no other users are using is searched and assigned to the user, and connection is made from the thin client terminal to the assigned client. For user convenience, it is also important to minimize the operations required for connection. For this, a thin client connection management method is proposed, where a connection management server (or a connection management system having this connection management server) is installed, for example, and this connection management server manages the states of all the clients, searches and available clients according to the request from the thin client terminal, and replies with the search result (e.g. see Patent Publication JP-A-2008-140306).

In the above-mentioned prior art, however, the scale of the system increases, and if a number of clients managed by the connection management server, and a number of connected thin client terminals increase, load on the connection management server becomes high and service may drop, such as a time lag in responding to a request from a thin client terminal.

SUMMARY

With the foregoing in view, it is an object of the present invention to provide a connection management system which can minimize the load on each server and network traffic, and a method for linking the connection management servers in a thin client system.

To solve this problem, the present inventor performed various examinations. A possible method for solving the above-mentioned problem is providing a plurality of connection management servers to distribute load. There are some possible ways of implementing load distribution by a plurality of servers, as mentioned below, but each way has a problem. Examples will now be described.

The first method is that each connection management server completely independent from one another, managing clients and requests/responses to thin client terminals. This is time consuming for the user, since the user must specify which connection management server a connection request is sent to, depending on which client the user wants to connect to.

The second method is that necessary information is managed by one data base, and all the connection management servers access the data base to manage the state of the clients, and perform the processing of the requests/responses from the thin client terminals. A problem with this method is that all kinds of processings related to the data base are performed by a server where this data base is running, and this server could become a bottleneck of the thin client system.

The third method is that each connection management server has a data base, and each server independently manages the states of clients, and performs processing of requests/responses from the thin client terminals, synchronizing the information of the respective data base required for processing. The available methods for synchronizing the data bases are a method for synchronizing periodically, and a method for synchronizing every time information in a data base changes. In order to process the connection management maintaining consistency, the state of the clients are constantly monitored, so in the case of the former method, a same client may be assigned to a plurality of users at the same time since each server can not access the latest information, while in the case of the latter method, communication and processing for synchronization are performed frequently and the load on each server and network increases, therefore this method is not appropriate for a connection management system.

The fourth method is that each connection management server has a data base, and only information related to the clients that each server manages is stored in the data base of each server, and when each server processes a connection request from a thin client terminal, the servers are linked and the client is assigned by exchanging information among its servers. A problem of this method is that information is exchanged with all the connection management servers every time a connection is requested from a thin client terminal, and load on each server and network increases.

The present inventor performed various examinations focusing on the above-mentioned methods for implementing load distribution and respective problems, and reached new knowledge that could solve the problem. The present invention, which is based on this knowledge, is a connection management system comprising a plurality of connection management servers each managing connection from a thin client terminal to a thin client server, wherein the connection management servers manage states of clients in order to hold the states of the clients, and each of the connection management servers executes a search of a client available for the thin client terminal according to a connection request from this thin client terminal, and replies with the search result to the thin client terminal, and a range of the connection management servers for executing the search of the client is limited for each connection request from the thin client terminal to the thin client server.

In this case, it is preferable that each of the connection management servers comprises a server configuration information table which stores, for each of the connection management servers, identification information of a group to which the connection management server belongs; a request window unit which accepts a connection request from the thin client terminal, selects a connection management server which executes the search of the client based on a group specified by a user, and transmits a search request to the selected connection management server; and a connection destination management unit which receives the search request, and selects a connectable client out of target clients that can be assigned to the thin client terminal to respond to the request.

In the connection management system, it is preferable that the clients are grouped.

A thin client system according to the present invention comprises: a plurality of thin client terminals; a plurality of thin client servers having clients which are connected from the thin client terminals to execute applications; and the above-mentioned connection management system.

The present invention is also a method for linking a connection management server in a thin client system having a plurality of thin client terminals, a thin client server having a client which is connected from the thin client terminals to execute applications, and the connection management server which manages connection from the thin client terminals to the thin client server, comprising the steps of: installing the connection management server in plurality so that any of the connection management servers executes acceptance of a connection request from the thin client terminal; the connection management servers managing states of clients in order to hold the states of the respective clients, and each of the connection management servers searching a client that can be connected by the thin client terminal according to a connection request from this thin client terminal, and replying with the search result to the thin client terminal; and limiting a range of the connection management servers for executing the search of the client for each connection request from the thin client terminal to the thin client server.

In the method for linking the connection management server according to the present invention, load on each connection management server (e.g. CPU load) and network traffic can be minimized by appropriately limiting the range of the connection management servers for searching available clients.

It is preferable that each of the connection management servers undertakes acceptance of the connection request from the thin client terminal, and response of the result of selecting a connectable client, and refers to a configuration information table which stores information on each of the connection management servers, when a range of destinations of transferring the connection request from this thin client terminal is determined.

It is preferable that each of the connection management servers comprises a connection destination management unit which searches a connectable client group, selects a client that can be connected by the thin client terminal, and manages a state of the client, the method further comprising a step of transferring the search request to the connection destination management unit in this connection management server and to the connection destination management unit in other connection management servers, determining a range of transfer destinations, and tabulating the responses to the transferred search requests.

In the present invention, the request window unit in the connection management server undertakes acceptance of a connection request from a thin client terminal, and undertakes a request/response (including selection of a client to which the thin client terminal can be connected, and reply of this result), which were conventionally performed by the connection destination management unit. By introducing this request window unit, the internal functions of the connection management server can be separated into a hierarchy for communicating with the outside (request window unit), and a hierarchy for searching an available client group (connection destination management unit), and a configuration more suitable for linking the connection management servers can be established without changing the conventional connection destination management unit at all.

The server configuration information table is a table which is referred to when a range of the transfer destinations of the request is determined. The more transfer destinations exist, available clients can be searched in a wider range, but a heavier load is applied on the network and servers. Therefore transfer destinations are limited utilizing the characteristics of the thin client system in which a plurality of users share a client, so as to decrease load.

In many cases, a user belonging to a specific group (department) uses one client which the connection management server assigned, out of some clients belonging to a specific group (assigned to a department by an administrator) using only some specific thin client terminals (personal stationary terminal of user, mobile terminal, terminal shared in a department). In this case, clients which are frequently connected are specified for each thin client terminal, so a connection management server managing the clients which are frequently connected for each thin client terminal is registered in advance as a connection management server to which the thin client terminal is connected first, so that an available client can be searched within the local server (this connection management server) without searching other connection management servers. Therefore in this thin client system, applying load on other servers and the network can be prevented.

If a client group is managed by a part of the connection management servers of the thin client system, clients can be searched only in this part of the connection management servers. Then applying load on other servers can be prevented.

In some cases, from a shared thin client terminal installed in a place that is different form a normal location of use, such as on a business trip, the user may connect to a client group the user normally uses (a different client group from one which the terminal in the business trip location is often connected to). In this case, an available client can not be found merely by searching a specific connection management servers registered in the shared thin client terminal. Therefore in such a case, it is preferable that the user can request searching from the connection management servers in a wider range, or all the connection management servers.

According to the present invention, load on each server and network traffic can be minimized by appropriately limiting the range of servers to be searched.

DESCRIPTION OF THE DRAWINGS

FIG. 2 is an example of a group information management table;

FIG. 3 is an example of a connection destination setting information table;

FIG. 4 is an example of a client state management table;

FIG. 5 is an example of a server configuration information table; and

FIG. 6 is a sequence diagram depicting an example of a procedure of connection management when connection is performed from a thin client terminal to a thin client server.

EXEMPLARY EMBODIMENT

Figure 1:
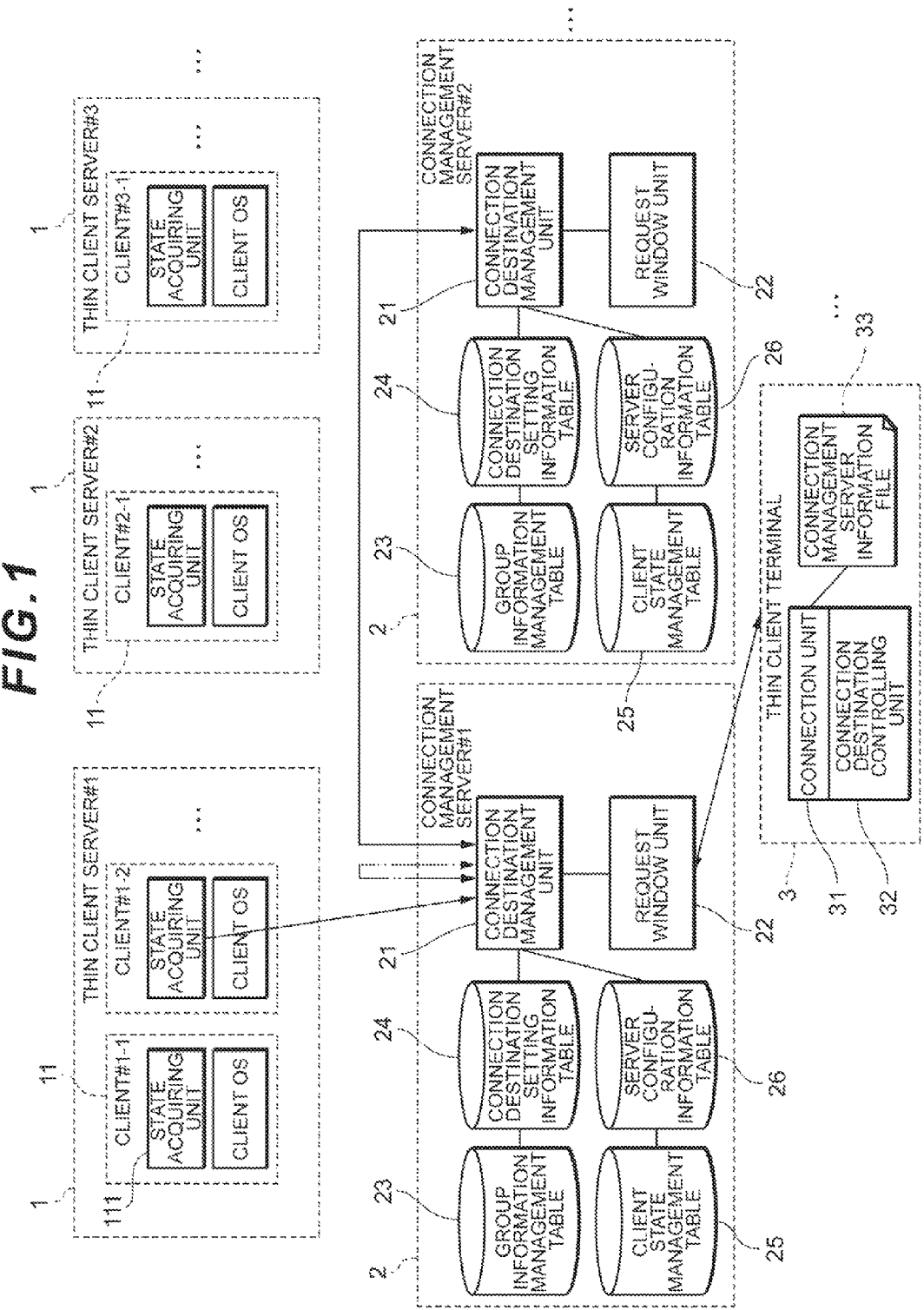
FIG. 1 is a block diagram depicting a thin client system according to an exemplary embodiment of the present invention.

A configuration of the present invention will now be described in detail according to an exemplary embodiment shown in the drawings.

FIG. 1 is a configuration example of a thin client system according to an exemplary embodiment of the present invention. The illustrated thin client system is comprised of a plurality of thin client servers 1, a plurality of thin client terminals 3, and a plurality of connection management server 2 which manage connection from each thin client terminal 3 to a client 11 of each thin client server 1. The connection management servers 2 are disposed in a network connecting the thin client servers 1 and the thin client terminals 3.

Each thin client server 1 has a client 11 which is a virtually constructed computed machine. An OS (client OS), business applications and data are installed on each client 11, and each client 11 has a state acquiring unit 111. Each client 11 is assigned to the user for use each time the user connects to the connection management server 2 from the thin client terminal 3. The state acquiring unit 111 has a function to transmit the state of the client 11 (e.g. power ON, power OFF, log OFF, log ON) to the connection destination management unit 21 of the connection management server 2.

The connection management server 2 has a connection destination management unit 21, a request window unit 22, a group information management table 23, a connection destination setting information table 24, a client state management table 25, and a server configuration information table 26 (see FIG. 1).

The request window unit 22 receives a connection request to the client 11 from the thin client terminal 3, transfers the request to the connection destination management units 21 in the local server and other servers, determining the range of the transfer destinations, tabulates responses to the transferred requests, and returns the received response to the request to the thin client terminal 3. This request window unit 22 undertakes the acceptance of the request from the thin client terminal 3 and the response thereto, which were conventionally performed by the connection destination management unit 21. By introducing this request window unit 22, a hierarchy for communicating with the outside (this request window unit 22) and a hierarchy for searching an available client group (connection destination management unity 21) can be separated, and a server linking configuration (a linking configuration for a plurality of connection management servers 2 to support the state management of many clients 11 and connection from many thin client terminals 3) can be established without changing the conventional connection management unit at all.

The connection destination management unit 21 has a function to search a connectable client group, for the request transferred from the request window unit 22, and determine a connection destination client to which the thin client terminal 3 is connected to, and manage the states of the clients 11.

The group information management table 23, the connection destination setting information table 24, the client state management table 25, and the server configuration information table 26 respectively store necessary information for the connection destination management unit 21 to manage connection.

The group information management table 23 stores, as FIG. 2 shows, information on a user name (user ID), a thin client terminal 3 and a client 11, and information on a group where each user, thin client terminal 3 and client 11 belong. The connection destination setting information table 24 stores, as FIG. 3 shows, information on a user (user ID) group and thin client terminal group which can be connected to each client group (linking information). The client state management table 25, stores, as FIG. 4 shows, information for each client on the state of the client 11. The server configuration information table 26 stores, as FIG. 5 shows, information of each server used for determining transfer destination of a request from the thin client terminal 3. The data in the group information management table 23, the connection destination setting information table 24 and the server configuration information table 26 must be set before starting operation of the thin client system (before the user connects to the client 11).

The thin client terminal 3 has a connection unit 31, a connection destination control unit 32 and a connection management server information file 33. In the connection management server information file 33, information (IP address) of a connection management server 2, to which each thin client terminal 3 should be connected, is specified in advance. The connection management server 2 specified here is a connection management server managing clients 11 which are frequently used from this terminal. The connection destination control unit 32 has a function to obtain input from the user on the user ID information and search range on the thin client terminal 3 and a search range, transmit the input information and thin client terminal information of the thin client terminal 3 to the request window unit 22 of the connection management server 2 specified by the connection management server information file 33, then obtain information on connectable clients from the request window unit 22, and transmit this information to the connection unit 31. The connection unit 31 has a function to connect to the client 11 based on the received information.

Now a connection management procedure when connection is performed from a thin client terminal 3 to a thin client server 1 will be described with reference to FIG. 6.

When the user attempts to connect to a client 11 using a thin client terminal 3, the user inputs the user ID to the thin client terminal 3, and specifies the search range at the start of using the thin client terminal 3. Then the connection destination control unit 32 obtains the user information (user ID) which the user input and the specified search range, then transmits the user information which was input, information of the thin client terminal 3 which the user is using (thin client terminal information), and the search range to the request window unit 22 of the connection management server 2 specified by the connection management server information file 33 (hereafter "default connection measurement server"), and request a list of an available client group (step Z1). The request window unit 22 of the default connection management server 2 receives the user information, the thin client terminal information and the search range, and determines a connection management server 2 to be the transfer destination of the connection request based on the specified search range and the server configuration information table 26 (step Z2). At this time, the connection management server 2 determined as the transfer destination may include the default connection management server.

A method for determining a transfer destination server will now be described with reference to FIG. 5. For example, it is assumed that in step Z1, a connection management server #1, which is the default connection management server, received information on "servers of which value of the range identifier (group ID) is 1 or less" as a search range from the thin client terminal 3. In this case, in step Z2, the default connection management server #1 refers to the server configuration information table 26 in the local server, and extracts the servers of "which value of the range identifier is 1 or less". Thereby the connection management server #1 and the connection management server #2 are determined as the transfer destination servers. The connection management server #3, of which the value of the range identifier is 2, on the other hand, does not become a transfer destination. In step Z2, the connection management servers 2 to be the transfer destinations can be freely changed depending on the way of assignment of the range identifiers and the conditions to determine the search range. However if the user specifies a complicated search range, operability drops, so it is preferable to provide the user with simple and clear choices, such as "connect to clients in the Personnel Department", or "search all connectable clients", as a user interface for the user to specify the search range, so that the user can easily specify the search range.

Then the request window unit 22 transfers the user information and the thin client terminal information to the connection destination management unit 21 of the connection management server of each transfer destination determined in step Z2 (including the default connection management server in the case of this exemplary embodiment) (step Z3). The connection destination management unit 21 of each connection management server 2 which received the user information and the thin client terminal information extract client groups linked with this information from the connection destination setting information table 24 using the received user information and the thin client terminal information (step Z4).

Any linking method may be used, such as forming a group of clients, thin client terminals and users, and linking each group. Thereby an operation format where a plurality of users belonging to a specific group, such as the "Personnel Department", share clients and thin client terminals, for example, can be implemented, and the present invention is also assuming this way of linking.

The extracted list of connectable client groups is transmitted from the connection destination management unit 21 of each connection management server 2 to the request window unit 22 of the default connection management server 2 (step Z5). The request window unit 22 of the default connection management server 2 tabulates lists of the client group transmitted from each connection management server (including the default connection management server in the case of this exemplary embodiment) (step Z6). The tabulated list is transmitted to the connection destination control unit 32 of the thin client terminal 3 (step Z7). Responding to this, in the thin client terminal 3, the connection destination control unit 32 has the user select a connection target client group, out of the list of connectable client groups, and transmits the information on the selected client group to the request window unit 22 of the default connection management server 2 (step Z8).

The request window unit 22 of the default connection management server 2 receives information on the selected client group, and specifies a connection management server 2 which transmitted a list including this selected client group (step Z9), and transfers the information on the selected client group to the connection destination management unit 21 of the specified connection management server 2 (step Z10). The connection destination management unit 21 which received the information searches the client state management table 25 so as to select a client 11 available for the client group, that is, a client no user is logged on to (step Z11). Then the connection destination management unit 21 transmits the information on the client 11 to the request window unit 22 of the default connection management server 2 (step Z12). The request window unit 22 of the default connection management server 2 which received the information on the client transmits the information on the client to the connection destination control unit 32 (step Z13).

The connection destination control unit 32 which received information on the connection target client 11 like this inputs the information on the client 11 to the connection unit 31 of the thin client terminal 3 (step Z14). As a result, the connection unit 31 connects to the client 11 (step Z15), and the state acquiring unit 111 on the client 11 updates the state of the client 11 of the client state management table 25 via the connection destination management unit 21 (step Z16).

As described above, the connection management server 2 can search a connectable client from a desired range for the thin client terminal 3, and has the thin client terminal 3 connect to the client 11.

As mentioned above, in the connection management server 2 according to the present exemplary embodiment and the thin client system having this connection management server, a plurality of servers can perform the connection management in the thin client system, which was conventionally performed by one connection management server, hence a large scale thin client system comprised of more users, thin client terminals thin client servers and clients, can be constructed and operated.

Furthermore, in a connection management performed by the connection management server 2 according to the present exemplary embodiment and the thin client system having this connection management server, clients 11 can be searched in a wide range only when the user connects to a client 11 using a thin client terminal 3 which is normally not used, such as a case of a business trip, and can search minimum connection management servers 2 in a normal state. Therefore a range of the servers (connection management servers 2) for searching an available client 11 in each connection request from the thin client terminal 3 to the client 11 can be appropriately limited, so as to minimize the load on each server (e.g. CPU load) and network traffic.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The present invention is preferably applied to connection management in a thin client system comprised of a plurality of thin client terminals 3 and a thin client server 1 having a client 11, which is connected from the thin client terminal 3 to execute applications, to perform connection from the thin client terminal 3 to the thin client server 1.

What is claimed is:

1. A connection management system comprising a plurality of connection management servers each managing a connection from a thin client terminal to a thin client server, wherein
each of the connection management servers comprises:
a server configuration information table which stores, for each of the connection management servers, identification information of a group to which the connection management server belongs;
a request window unit which accepts a connection request from the thin client terminal, selects a connection management server which executes the search of the client based on a group specified by a user, and transmits a search request to the selected connection management server; and
a connection destination management unit which receives the search request, and selects a connectable client out of target clients that can be assigned to the thin client terminal to respond to the request, wherein
the connection management servers manage states of clients in order to hold the states of the clients, and each of the connection management servers executes a search of a client available for the thin client terminal according to a connection request from this thin client terminal, and replies with the search result to the thin client terminal, and
a range of the connection management servers for executing the search of the client is limited in response to the states of the clients and a load situation of the connection management servers for each connection request from the thin client terminal to the thin client server;
and wherein each of the connection management servers undertakes acceptance of the connection request from the thin client terminal, and response of the result of selecting a connectable client, and refers to a configuration information table which stores information on each of the connection management servers, when a range of destinations of transferring the connection request from this thin client terminal is determined.

2. The connection management system according to claim 1, wherein the clients are grouped.

3. A thin client system comprising:
a plurality of thin client terminals;
a plurality of thin client servers having clients which are connected from the thin client terminals to execute applications; and
the connection management system according to claim 1.

4. A method for linking a connection management server in a thin client system having a plurality of thin client terminals, a thin client server having a client which is connected from the thin client terminals to execute applications, and the connection management server which manages connection from the thin client terminals to the thin client server,
wherein each of the connection management servers comprises:
a server configuration information table which stores, for each of the connection management servers, identification information of a group to which the connection management server belongs;
a request window unit which accepts a connection request from the thin client terminal, selects a connection management server which executes the search of the client based on a group specified by a user, and transmits a search request to the selected connection management server; and
a connection destination management unit which receives the search request, and selects a connectable client out of target clients that can be assigned to the thin client terminal to respond to the request;
the method comprising the steps of:
installing a plurality of connection management servers so that any of the connection management servers executes acceptance of a connection request from the thin client terminal;
the connection management servers managing states of clients in order to hold the states of the respective clients, and each of the connection management servers searching a client that can be connected by the thin client terminal according to a connection request from this thin client terminal, and replying with the search result to the thin client terminal; and
limiting a range of the connection management servers for executing the search of the client in response to the states of the clients and a load situation of the connection management servers for each connection request from the thin client terminal to the thin client server;
and wherein each of the connection management servers undertakes acceptance of the connection request from the thin client terminal, and response of the result of selecting a connectable client, and refers to a configuration information table which stores information on each of the connection management servers, when a range of destinations of transferring the connection request from this thin client terminal is determined.

* * * * *